(12) United States Patent
Garofalakis et al.

(10) Patent No.: US 7,080,314 B1
(45) Date of Patent: Jul. 18, 2006

(54) DOCUMENT DESCRIPTOR EXTRACTION METHOD

(75) Inventors: Minos N. Garofalakis, Chatham Township, NJ (US); Aristides Gionis, Stanford, CA (US); Rajeev Rastogi, New Providence, NJ (US); Srinivasan Seshadri, Basking Ridge, NJ (US); Kyuseok Shim, Bedminster, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 970 days.

(21) Appl. No.: 09/595,719

(22) Filed: Jun. 16, 2000

(51) Int. Cl.
*G06F 15/00* (2006.01)

(52) U.S. Cl. ...................... 715/500; 715/513

(58) Field of Classification Search ............... 715/513, 715/500, 501.1; 717/142
See application file for complete search history.

(56) References Cited

U.S. PATENT DOCUMENTS

| | | | | |
|---|---|---|---|---|
| 4,876,720 A * | 10/1989 | Kaneko et al. | ............. | 704/240 |
| 5,299,206 A * | 3/1994 | Beaverson et al. | .......... | 714/724 |
| 5,812,999 A * | 9/1998 | Tateno | ............................ | 707/3 |
| 5,926,823 A * | 7/1999 | Okumura et al. | ........... | 715/514 |
| 5,930,746 A * | 7/1999 | Ting | .............................. | 704/9 |
| 5,977,890 A * | 11/1999 | Rigoutsos et al. | ............ | 341/55 |
| 6,061,697 A * | 5/2000 | Nakao | ......................... | 715/513 |
| 6,078,884 A * | 6/2000 | Downey | ..................... | 704/243 |
| 6,092,065 A * | 7/2000 | Floratos et al. | ................. | 707/6 |
| 6,108,666 A * | 8/2000 | Floratos et al. | .......... | 707/104.1 |
| 6,134,512 A * | 10/2000 | Barrett | ........................ | 703/13 |
| 6,167,523 A * | 12/2000 | Strong | ........................ | 713/201 |
| 6,202,072 B1 * | 3/2001 | Kuwahara | .................... | 715/513 |
| 6,282,681 B1 * | 8/2001 | Sun et al. | .................... | 714/738 |
| 6,330,574 B1 * | 12/2001 | Murashita | .................... | 715/513 |
| 6,373,971 B1 * | 4/2002 | Floratos et al. | ............. | 382/129 |
| 6,438,540 B1 * | 8/2002 | Nasr et al. | ...................... | 707/3 |
| 6,487,566 B1 * | 11/2002 | Sundaresan | .................. | 715/513 |
| 6,507,856 B1 * | 1/2003 | Chen et al. | .................. | 715/513 |
| 6,515,978 B1 * | 2/2003 | Buehrer et al. | ............. | 370/342 |
| 6,519,617 B1 * | 2/2003 | Wanderski et al. | ......... | 715/513 |
| 6,532,556 B1 * | 3/2003 | Wong et al. | ................. | 714/702 |
| 6,553,072 B1 * | 4/2003 | Chiang et al. | ......... | 375/240.25 |
| 6,569,207 B1 * | 5/2003 | Sundaresan | .................. | 715/513 |
| 6,604,099 B1 * | 8/2003 | Chung et al. | ................... | 707/3 |
| 6,651,059 B1 * | 11/2003 | Sundaresan et al. | ........... | 707/6 |
| 6,675,219 B1 * | 1/2004 | Leppinen et al. | ............ | 709/230 |
| 6,718,317 B1 * | 4/2004 | Wang et al. | ................... | 706/50 |
| 6,766,330 B1 * | 7/2004 | Chen et al. | ................. | 707/102 |
| 6,779,154 B1 * | 8/2004 | Nussbaum et al. | ......... | 715/523 |
| 6,810,398 B1 * | 10/2004 | Moulton | ........................ | 707/6 |
| 6,912,538 B1 * | 6/2005 | Stapel et al. | ................. | 707/101 |
| 2001/0011287 A1 * | 8/2001 | Goto et al. | .................. | 707/513 |
| 2001/0027459 A1 * | 10/2001 | Royal | .......................... | 707/513 |
| 2002/0002566 A1 * | 1/2002 | Gajraj | .......................... | 707/513 |
| 2002/0085032 A1 * | 7/2002 | Fong et al. | ................. | 345/760 |
| 2003/0056193 A1 * | 3/2003 | Perycz et al. | ................ | 717/107 |
| 2003/0208473 A1 * | 11/2003 | Lennon | ......................... | 707/3 |

(Continued)

OTHER PUBLICATIONS

Papakonstantinou et al., DTD Inferrence for Views of XML Data, ACM May 2000, pp. 35-46.*

(Continued)

*Primary Examiner*—Cong-Lac Huynh

(57) ABSTRACT

The present invention discloses a document descriptor extraction method and system. The document descriptor extraction method and system creates a document descriptor by generalizing input sequences within a document; factoring the input sequences and generalized input sequences; and selecting a document descriptor from the input sequences, generalized sequences, and factored sequences, preferably using minimum descriptor length (MDL) principles. Novel algorithms are employed to perform the generalizing, factoring, and selecting.

18 Claims, 2 Drawing Sheets

U.S. PATENT DOCUMENTS

2004/0039993 A1* 2/2004 Kougiouris et al. ........ 715/513
2004/0133569 A1* 7/2004 Munetsugu et al. ........... 707/3

OTHER PUBLICATIONS

Moh et al., Re-Engineering Structures from Web Documents, ACM Jun. 2, 2000, pp. 67-76.*

Dodge, Using SGML to Streamline Print and CD-ROM Production, CD-ROM Professional, Mar. 1994, vol. 7, iss. 2, p. 77, 5 pg.*

Ashish et al., Wrapper Generation for Semi-Structured Internet Sources, ACM Dec. 1997, pp. 8-15.*

Wallace et al., Haskell and XML: Generic Combinators or Type-Based Translation?, ACM 1999, pp. 148-159.*

Bergamaschi et al., An Approach for the Extraction of Information from Heterogeneous Sources of Textual Data, Google Augus 1997, pp. 1-7.*

Poulin et al., The Oher Formalization of Law: SGML Modelling and Tagging, ACM 1997, pp. 82-88.*

Adelberg, NoDoSE—a Tool for Semi-Automatically Extracting Structured and Semistructured Data from Text Documents, ACM Jun. 1998, pp. 283-294.* www.alphaworks.ibm.com/aw.nsf/techmain/DDbE: Data Descriptors by Example; Application Development, Java, XML; Leonard Berman and Angel Diaz; Posted Jun. 11, 1999; Updated Mar. 8, 2000; Printed May 12, 2000.

* cited by examiner

DOCUMENT DESCRIPTOR EXTRACTION METHOD

FIELD OF THE INVENTION

The present invention relates to electronic documents. Specifically, the present invention relates to determining document descriptors from data within electronic documents.

BACKGROUND OF THE INVENTION

The number of documents available in electronic format has exploded. With the number of available electronic documents increasing rapidly, it is important to be able to quickly and accurately search the available electronic documents. In addition, it is desirable to be able to store data into electronic documents and generate new electronic documents which are similar in structure to existing electronic documents. Hence, tools which assist in the querying of electronic documents, the creation of electronic documents, and the storage of data into electronic documents are desirable.

Electronic documents for display over the Internet and/or an Intranet are commonly stored in a Standard Generalized Markup Language (SGML) format. SGML is a standard for how to specify a document markup language or tag set. SGML is not in itself a document language, but a description of how to specify one. The SGML format provides for the inclusion of a document type descriptor (DTD). A document's DTD specifies how the data within a document should be organized. One SGML format for storing data within electronic documents which is becoming increasingly popular is eXtensible Markup Language (XML). XML is rapidly emerging as the new standard for representing and exchanging data on the World Wide Web (web). An XML document may be accompanied by a document type descriptor (DTD). For example, in an XML document, the DTD may specify the tags which can be used, the order in which the tags appear, how the tags are nested, and tag attributes. Thus, the DTD plays an important role in the storage of data to the XML document, the generation of similar documents, and increasing the efficiency of queries of the XML document. Efficiency is achieved by using the knowledge of the structure of the data to remove elements that cannot potentially satisfy the query.

Although DTDs are helpful in the storage, generation, and retrieval of data related to an XML document, DTDs are not mandatory. Since DTDs are not mandatory, many XML documents exist which do not contain DTDs. In addition, since only a small portion of the electronic documents in existence today are in an XML format, initially the majority of XML documents will likely be automatically generated from pre-existing non-XML documents. In many instances, the automatically generated XML formatted documents will not contain DTDs. Therefore, a tool for automatically generating DTDs is desirable for improving data storage and retrieval.

Others have attempted to automatically generate DTDs with varying degrees of success. One system is IBM's Data Descriptors by Example (DDbE) system. The goal of DDbE is to give users a good start at creating DTDs for their own applications. However, this system and other available systems do not produce highly accurate DTDs for all XML documents, especially complex XML documents. Since accurate DTDs enable efficient storage and retrieval of data, improved methods for extracting accurate DTDs from XML documents are desirable.

SUMMARY OF THE INVENTION

The present invention relates to developing a description of the layout of an electronic document from data within the document. The present invention is especially useful for determining document type descriptors (DTDs) of electronic documents in a Standard Generalized Markup Language (SGML) format.

The present invention comprises generalizing input sequences generated from an electronic document. The input sequence are generalized to create generalized sequences which are representative of the input sequences. Each generalized sequence encompasses one or more input sequences in a more general form. Next, the present invention comprises selecting a description of the layout of the electronic document from the input sequences and generalized sequences. Selecting a description comprises selecting one or more of the input sequences and generalized sequences such that every input sequence is encompassed by the selected sequences. Preferably, the selection is performed using minimum descriptor length (MDL) principles.

Additionally, the present invention may comprise factoring the input sequences and generalized sequences after generalizing to create factored sequences which can be included in the selection of the description. Each factored sequence encompasses one or more input sequences and generalized sequences. The factored sequence are combined with the input sequences and generalized sequences, thereby creating a potentially better selection of sequences from which a description may be selected.

DETAILED DESCRIPTION OF THE INVENTION

Figure 1:
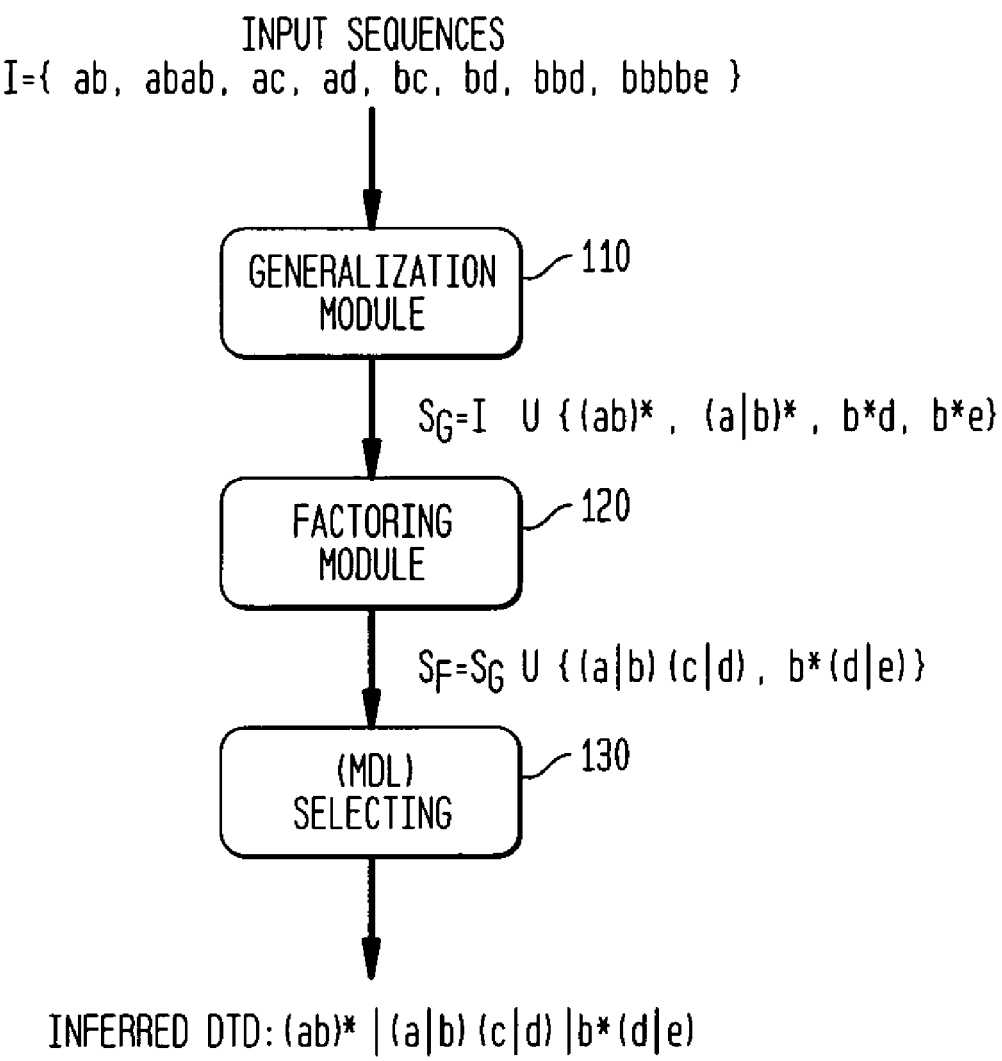
FIG. 1 is a flow chart of a preferred document type descriptor (DTD) extraction system in accordance with the present invention.

The present invention relates to inferring (i.e., determining) document descriptors from data within electronic documents. For illustrative purposes, the present invention is described in terms of inferring document type descriptors (DTDs) from data within eXtensible Markup Language (XML) formatted documents. However, it will be readily apparent to those skilled in the art that the present invention could be applied to other types of markup languages which provide document descriptions that are currently available or developed in the future, such as markup languages which conform to the Standard General Markup Language (SGML) format. The inferred DTD contains valuable information about the structure of the XML documents that it describes. The structural information may be used to efficiently query the XML document, store data to the XML document, or generate similar XML documents.

A sample XML document and its associated DTD are as follows:

---

Sample XML Document

```
<article>
    <title> A Relational Model </title>
    <author>
        <name> A. B. Cod </name>
        <affiliation> ABC Corp. </affiliation>
    </author>
</article>
<article>
    <title> Another Model </title>
    <author>
        <name> A. Swift </name>
        <affiliation> XYZ Corp. </affiliation>
    </author>
    <author>
        <name> B. Quick </name>
        <affiliation> ZYX Corp. </affiliation>
    </author>
    <author>
        <name> C. Gold </name>
        <affiliation> XYZ Corp. </affiliation>
    </author>
    <author>
        <name> O. Henry </name>
        <affiliation> XYZ Corp. </affiliation>
    </author>
    <author>
        <name> E. Plant </name>
        <affiliation> XYZ Corp. </affiliation>
    </author>
</article>
```

Sample Document Type Descriptor (DTD)

```
<!ELEMENT article (title, author*)>
<!ELEMENT title (#PCDATA)>
<!ELEMENT author (name, affiliation)>
<!ELEMENT name (#PCDATA)>
<!ELEMENT affiliation (#PCDATA)>
```

---

A DTD describes the structure of an XML document. A DTD constrains the structure of an element by specifying a regular expression with which its sub-element sequences must conform. The DTD declaration sequence uses commas for sequencing, |for exclusive OR, parenthesis for grouping and meta-characters ?, *, + to denote zero or one, zero or more, and one or more, respectively.

In the sample XML document above and its associated DTD, the start of an element such as article is indicated by <article> and the end of the element is indicated by </article>. Each element may comprise sub-elements and/or data. For example, for the element article, title and author are sub-elements. Likewise, sub-elements may further contain additional sub-elements. For example, author contains sub-element name and sub-element affiliation.

In a preferred embodiment, the present invention applies algorithms in three steps to compute a DTD from a set of input sequences. They are (1) generalizing, (2) factoring, and (3) selecting.

The input sequences are groupings of sub-elements contained within each occurrence of an element. For an element, such as article, it is straight forward to compute the sequence of sub-elements nested within each <article> </article> pair in the XML document. The set of input sequences comprises one sequence for each occurrence of element <article>. For example, in the above XML document sample the input sequences for <article> would be input sequences <title><author> and <title><author><author><author><author><author>. For ease of description, the first letter of the sub-element may be used as a shorthand for describing sequences (e.g., <title><author> is represented by ta and <title><author><author><author><author><author> is represented by taaaaa.)

In the preferred embodiment, the input sequences are generalized to create generalized sequences. The generalized sequences and input sequences are then factored to create factored sequences. Each factored sequence may encompass one or more input sequences and generalized sequences, thereby creating additional sequences which may be selected as a part of a DTD. The factoring step is optional. However, using the factoring step results in potentially better DTDs. Factoring leads to better DTDs by creating additional sequences from which an appropriate DTD may be selected. A DTD which encompasses all of the input sequences is then selected from the input sequences, generalized sequences, and factored sequences.

In the generalization step, patterns within the input sequences are detected and more "general" regular expressions are substituted for them to create "generalized" sequences. In a preferred embodiment, the "generalized" sequences and the input sequences are then processed by the factorization step which factors common expressions to make them more succinct. The factorization step yields "factored" sequences. The first two steps along with the input sequences produce a series of potential DTDs that vary in their conciseness and precision. A selection step then selects a DTD from the candidates that strikes the right balance between conciseness and preciseness—that is, a DTD that is concise, but at the same time, is not too general. In a preferred embodiment, the selection step employs minimum descriptor length (MDL) principles for selecting a DTD.

FIG. 1 depicts a flow chart 100 illustrating the steps for inferring a DTD in accordance with a preferred embodiment of the present invention. The input sequences I are comprised of sub-elements a, b, c, d, and e. The input sequences are first processed by a generalization module 110 which produces generalized sequences. The generalized sequences are combined with the input sequences to create a set of potential DTDs identified by $S_G$. Optionally, the potential DTDs are factored using a factoring module 120. The factoring module produces additional potential DTDs which are combined with the potential DTDs output by the generalization module 110 to create a set of potential DTDs identified by $S_F$. Finally, the selecting module 130 infers (i.e. selects) a DTD from all of the potential DTDs $S_F$. Preferably, the selecting module 130 incorporates MDL principles.

Figure 2:
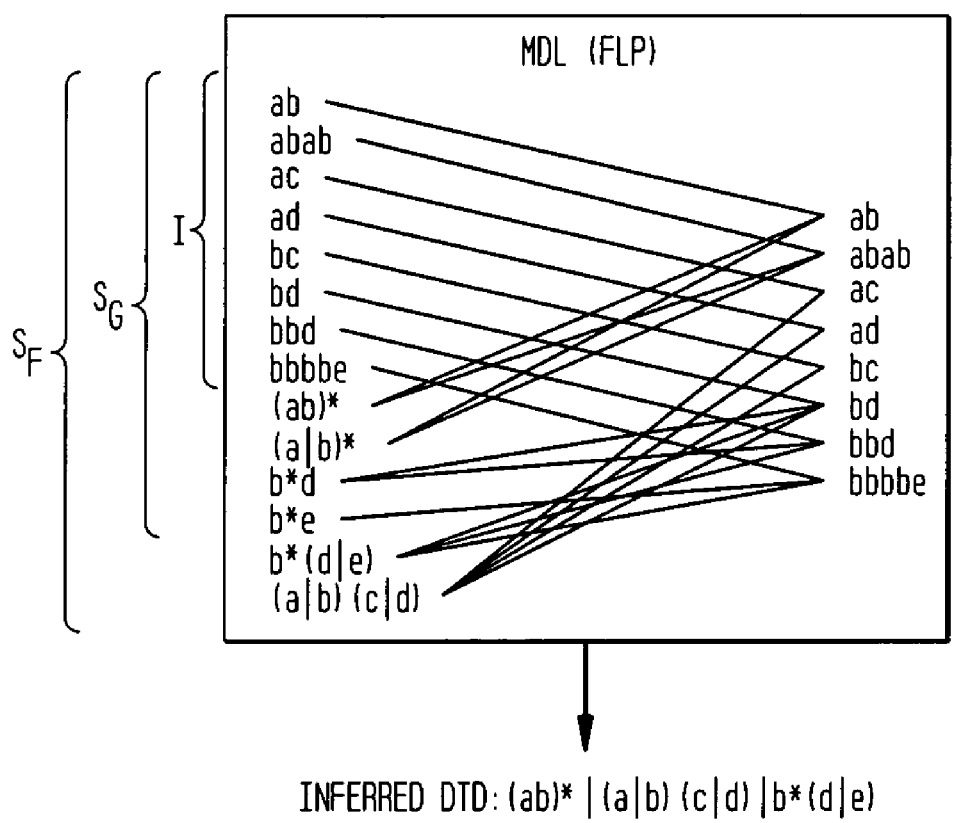
FIG. 2 is an illustrative depiction of the output of each step and the selection process of the preferred document type descriptor extraction system depicted in FIG. 1 in accordance with the present invention.

FIG. 2 graphically depicts the selection of a DTD from all of the potential DTDs. The selected DTD must encompass all of the original input sequences $S_F$. It can be seen that (ab)* encompasses input sequences ab and abab. Also, (a|b) (c|d) encompasses input sequences ac, ad, bc, and bd. Finally, b*(d|e) encompasses bd, bbd, and bbbbe. The selected potential DTDs, when combined using ORs, encompass all of the original input sequences. The result is a concise and precise DTD.

I. Generalizing

The quality of the data type descriptor (DTD) selected during the selection process is very dependent on the set of candidate DTDs available. If the selection were based on the input sequences only, then the final DTD output by the selection step would simply be the OR of all the input sequences. For example, in the above XML document sample, the DTD for <article> would comprise ta and taaaa (i.e., <title><author> and <title><author><author><author><author><author>.) However, this is not a desirable DTD since it is neither concise nor intuitive. A more concise and intuitive DTD would be the single sequence ta* which encompasses both ta and taaaaa. Thus, in order to infer meaningful DTDs, the candidate DTDs should be general. Ideally, each candidate DTD encompasses more than one input sequence. The goal of the generalization module 110 is to achieve this objective.

The generalization module 110 of the present invention infers a number of regular expressions which have been found to frequently appear in real-life DTDs. Below, are examples of regular expressions from real-life DTDs that appear in the Newspaper Association of America (NAA) Classified Advertising Standards XML DTD.

a* bc*: DTDs of this form are generally used to specify tuples with set-valued attributes. <!ELEMENT account-info (account-number, sub-account-number*)> <!--Specification for account identification information-->

(abc)*: This type of DTD is used to represent a set (or a list) of ordered tuples. <!ELEMENT days-and-hours (date, time)+> <!--provide times/dates when job fairs will be held-->

(a|b|c)*: The DTD of the form (a|b|c)* is frequently used to represent a multiset containing the elements a, b and c. This DTD is very useful since the elements in the multiset are allowed to appear multiple times and in any order in the document. For example, the following DTD specifies that the support information for an ad can consist of an arbitrary number of audio or video clips, photos, and further these can appear in any order. <!ELEMENT support-info (audio-clip|file-id|graphic|logo|new-list|photo|video-clip|zz-generic-tag)*> <!--support information for ad content-->

((ab)* c)*: This type of DTD permits nesting relationships among sets (OR lists). <!ELEMENT transfer-info (transfer-number, (from-to, company-id)+, contact-info)*> <!--provides parent information through the multilevel aggregation process, may be repeated-->

Table 1 depicts pseudo code for a preferred generalization algorithm (Procedure GENERALIZE). Procedure GENERALIZE infers several DTDs for each input sequence independently and adds them to the set $S_G$. The generalize algorithm may over-generalize in some cases (since DTDs are inferred based on a single sequence), however, the selection step in selecting module 130 will ensure that such overly-general DTDs are not chosen as part of the final inferred DTD, if there are better alternatives. The generalization step will provide several alternate candidates in addition to the input sequences for the selection step.

The algorithm can infer regular expressions that are more complex than the above, however, complex expressions, such as (ab?c* d?)*, that are less likely to occur in practice, may be excluded.

TABLE 1

Generalization Algorithm

```
procedure GENERALTZE(I)
begin
1.    for each sequence s in I
2.        add s to S_g
3.        for r := 2, 3, 4
4.            s':= DISCOVERSEQPATTERN(s, r)
5.            for d := 0.1 · |s'|,0.5 · |s'|,|s'|
6.                s" := DISCOVERORPATTERN(s', d)
7.                add s" to S_g
```

TABLE 1-continued

Generalization Algorithm

```
end
procedure DISCOVERSEQPATFERN(s, r)
begin
1.    repeat
2.        let x be a subsequence of s with the maximum number (≧r) of
          contiguous repetitions in s
3.        replace all (≧r) contiguous occurrences of x in s with a new
          auxiliary symbol A_i = (x)*
4.    until (s no longer contains ≧r contiguous occurrences of any
          subsequence x)
5.    return s
end
procedure DISCOVERSEQPATTERN(s, d)
begin
1.    s_1, s_2, . . . , s_n := PARTITION(s, d)
2.    for each subsequence s_j in s_1, s_2, . . . , s_n
3.        let the set of distinct symbols in s_j be a_1, a_2, . . . , a_m
4.        if (m>1)
5.            replace subsequence s_j in sequences by a new
              auxiliary symbol A_i = (a_1 | . . . | a_m)*
6.    return s
end
procedure PARTITION(s, d)
begin
1.    i := start := end := 1
2.    s_i := s[start, end]
3.    while (end < |s|)
4.        while (end < |s| and a symbol in s_i occurs to the right
              of s_i within a distance d)
5.            end := end + 1; s_i := s[start, end]
6.        if (end < |s|)
7.            i := i + 1; start := end + 1; end := end + 1; s_i := s[start,
                  end]
8.    return s_1, s_2 . . . , s_i
end
```

The essence of procedure GENERALIZE are the procedures DISCOVERSEQPATTERN and DISCOVERORPATTERN which are repeatedly called with predefined parameter values.

Discovering Sequencing Patterns (Procedure DISCOVERSEQPATTERN)

Procedure DISCOVERSEQPATTERN, shown in Table 1, takes an input sequence s and returns a candidate DTD that is derived from s by replacing sequencing patterns of the form xx . . . x, for a subsequence x in s, with the regular expression (x)*. In addition to s, the procedure also accepts as input, a threshold parameter r>1 which is the minimum number of contiguous repetitions of subsequence x in s required for the repetitions to be replaced with (x)*. In case there are multiple subsequences x with the maximum number of repetitions in step 2 of procedure DISCOVERSEQPATTERNS, the longest among them is chosen, and subsequent ties are resolved arbitrarily.

Note that instead of introducing the regular expression term (x)* into the sequence s, an auxiliary symbol that serves as a representative for the term is introduced. The use of auxiliary symbols enable the description of the algorithms to remain simple and clean since the input to them is always a sequence of symbols. In a preferred embodiment, there is a one-to-one correspondence between auxiliary symbols and regular expression terms in the present invention; thus, if the auxiliary symbol A denotes (bc)* in one candidate DTD, then it represents (bc)* in every other candidate DTD. Also, procedure DISCOVERSEQPATTERN may perform several iterations and thus new sequencing patterns may contain auxiliary symbols corresponding to patterns replaced in previous iterations. For example, invoking procedure DIS- COVERSEQPATTERN with the input sequence s=abababcababc and r=2 yields the sequence $A_1cA_1c$ after the first iteration, where $A_1$ is an auxiliary symbol for the term (ab)*. After the second iteration, the procedure returns the candidate DTD $A_2$, where $A_2$ is the auxiliary symbol corresponding to ((ab)*c)*. Thus, the resulting candidate DTD returned by procedure DISCOVERSEQPATTERN can contain *s nested within other *s. Finally, DISCOVERSE-QPATTERN is invoked with three different values for the parameter r to control the aggressiveness of the generalization. For example, for the sequence aabbb, DISCOVERSE-QPATTERN with r=2 would infer a*b*, while with r=3, it would infer aab*. In the selection step, if many other sequences are encompassed by aab*, then a DTD of aab* may be preferred to a DTD of a* b* since it more accurately describes the input sequences.

Discovering OR Patterns (Procedure DISCOVERORPATTERN)

Procedure DISCOVERORPATTERN, shown in Table 1, infers patterns of the form $(a_1|a_2|\ldots|a_m)$* based on the locality of these symbols within a sequence s. The locality is identified by first partitioning (performed by procedure PARTITION, shown in Table 1) the input sequence s into the smallest possible subsequences $s_1, s_2, \ldots, s_n$, such that for any occurrence of a symbol a in a subsequence $s_i$, there does not exist another occurrence of a in some other subsequence $s_j$ within a distance d (which is a parameter to DISCOVERORPATTERN). Each subsequence $s_i$ in s is then replaced by the pattern $(a_1|a_2|\ldots|a_m)$* where $a_1, \ldots, a_m$ are the distinct symbols in the subsequence $s_i$. If $s_j$ contains frequent repetitions of the symbols $a_1|a_2|\ldots|a_m$ in close proximity, then it is very likely that $s_i$ originated from a regular expression of the form $(a_1|a_2|\ldots|a_m)$*. For illustrative purposes, for the input sequence abcbac, procedure DISCOVERORPATTERN returns:

$a, A_1ac$ for d=2, where $A_1=(b|c)$*

$aA_2$ for d=3, where $A_2=(a|b|c)$*; and $A_2$ for d=4, where $A_2=(a|b|c)$*.

A preferred component for discovering OR patterns is procedure PARTITION, shown in Table 1. For a sequence s, s[ij] denotes the subsequence of s starting at the $i^{th}$ symbol and ending at the $j^{th}$ symbol of s. Procedure PARTITION constructs the subsequences in the order $s_1, s_2$, and so on. Assuming that $s_1$ through $s_j$ have been generated, it constructs $s_{j+1}$ by starting $s_{j+1}$ immediately after $s_j$ ends and expanding the subsequence $s_{j+1}$ to the right as long as there is a symbol in $s_{j+1}$ that occurs within a distance d to the right of $s_{j+1}$. By construction, there cannot exist such a symbol to the left of $s_{j+1}$.

Note that procedure GENERALIZE invokes DISCOVERORPATTERN on the DTDs that result from calls to DISCOVERSEQPATTERN and therefore it is possible to infer more complex DTDs of the form (a|(bc)*)* in addition to DTDs like (a|b|c)*. For instance, for the input sequence s=abcbca, procedure DISCOVERSEQPATTERN invoked with r=2 would return $s'=aA_1a$, where $A_1=(bc)$*, which, when input to DISCOVERORPATTERN returns $s''=A_2$ for d=|s'|, where $A_2=(a|A_1)$*. Further, DISCOVERORPATTERN is invoked with various values of d (expressed as a fraction of the length of the input sequence) to control the degree of generalization. Small values of d lead to conservative generalizations while larger values result in more liberal generalizations. The size of d is based on desired design characteristics.

II. Factoring

In a preferred embodiment, the factoring module 120 uses a factoring step to derive factored forms for expressions that are an OR of a subset of the candidate DTDs, $S_G$, out of the generalization module 110. For example, for candidate DTDs ac, ad, bc and bd in $S_G$, the factoring step would generate the factored form (a|b)(c|d). Note that since the final DTD is an OR of candidate DTDs, $S_F$, out of the factoring module 120, the factored forms are also candidates. Further, a factored candidate DTD, because of its smaller size, has a lower minimum description length (MDL) cost, and is thus more likely to be chosen in the selection step, if MDL principles are used. Thus, since factored forms (due to their compactness) are more desirable, factoring can result in better quality DTDs.

Factored DTDs are common in real life. For example, in the sample DTD, an article may be categorized based on whether it appeared in a workshop, conference or journal; it may also be classified according to its area as belonging to either computer science, physics, chemistry etc. Thus, the DTD (in factored form) for the element article would be as follows:

<!ELEMENT article(title, author*, (workshop|conference|journal), (computer science|physics|chemistry| . . . ))

The set of candidate DTDs, $S_F$, output by the factorization module, 120, in addition to the factored forms generated from candidates in $S_G$, also contains all the DTDs in $S_G$. Ideally, factored forms for every subset of $S_G$, should be added to $S_F$ to be considered by the selection step. However, this may be impractical, since $S_G$ could be very large. Therefore, a heuristic may be used to select subsets of candidates in $S_G$ that when factored yield good factored DTDs. In a preferred embodiment, the factoring algorithm is an adaptation of factoring algorithms for boolean expressions which are well known in the art.

Selecting Subsets of $S_G$ to Factor

Intuitively, a subset S of $S_G$ out of generalization module 110 is a good candidate for factoring if the factored form of S is much smaller than S itself. In addition, even though $S_G$ may contain multiple generalizations that are derived from the same input sequence, it is highly unlikely that the final DTD will contain two generalizations of the same input sequence. Thus, factoring candidate DTDs in $S_G$ that encompass similar sets of input sequences does not lead to factors that can improve the quality of the final DTD.

For a subset S of $S_G$ to yield good factored forms it must satisfy the following two properties:

(1.) Every DTD in S has a common prefix or suffix with a number of other DTDs in S. Further, as more DTDs in S share common prefixes or suffixes, or as the length of the common prefixes/suffixes increases, the quality of the generated factored form can be expected to improve.

(2.) The overlap between every pair of DTDs D; D' in S is minimal, that is, the intersection of the input sequences encompassed by D and D' is small. This is important because, as mentioned above, a factored DTD adds little value (from an MDL cost perspective) over the candidate DTDs from which it was derived if it cannot be used to encode a significantly larger number of input sequences compared to the sequences encompassed by each individual DTD.

In order to state properties (1) and (2) for a set S of DTDs more formally, the following notation is used. For a DTD D, let cover(D) denote the input sequences in I that are encompassed by D (note that auxiliary symbols are expanded completely when cover for a DTD is computed). Then, overlap(D, D') is defined as the fraction of the input sequences encompassed by D and D' that are common to D and D', that is, $$\text{overlap}(D, D') = \frac{|\text{cover}(D) \cap \text{cover}(D')|}{|\text{cover}(D) \cup \text{cover}(D')|} \quad (1)$$

Thus, for a sufficiently small value of a (user-specified) parameter δ, by ensuring that overlap(D,D')<δ for every pair of DTDs D and D' in S, it can be ensured that S satisfies property (2) mentioned above.

In order to characterize property (1) more rigorously, the function score(D,S) is introduced in equation 2. Function score (D, S) attempts to capture the degree of similarity between prefixes/suffixes of DTD D and those of DTDs in the set S of DTDs. Intuitively, a DTD with a high score with respect to set S is a good candidate to be factored with other DTDs in set S. For a DTD D, let pref (D) and suf(D) denote the set of prefixes and suffixes of D, respectively. Let psup(p,S) denote the support of prefix p in set S of DTDs, that is, the number of DTDs in S for which p is a prefix. Similarly, let ssup(s,S) denote number of DTDs in S for which s is a suffix. Then score(D,S) is defined as follows:

$$\text{score}(D,S) = \max(\{|p|.psup(p,S): p \in \text{pref}(D)\} \cup \{|s|*ssup(s,S): s \in \text{suf}(D)\})) \quad (2)$$

Thus, the prefix/suffix p=s of D, for which the product of p=s's length and its support in S is maximum, determines the score of D with respect to S. If DTD D has a long prefix or suffix that occurs frequently in set S, then this prefix can be factored out, thus resulting in good factored forms. The function score is thus a good measure of how well D would factor with other DTDs in S.

Procedure FACTORSUBSETS, shown in Table 2, first selects subsets S of sequences from within sequences $S_G$ that satisfy properties (1) and (2). Each of these subsets S is then factored by invoking procedure FACTOR (in Step 15), depicted in Table 3. Assuming that the factoring algorithm returns $F_1|F_2| \ldots F_m$, each of the $F_i$ is added to $S_F$.

TABLE 2

Choosing Subsets Of $S_g$ For Factoring

```
procedure FACTORSUBSETS(S_g)
begin
1.    for each DTD D is S_g
2.        Compute score (D,S_g)
3.    S_F := S' := S_g; SeedSet := Ø
4.    for i := 1 to k
5.        let D be the DTD in S' with the maximum value for score (D, S_g)
6.        SeedSet := SeedSet ∪ D
7.        S' := S' - {D' : overlap(D,D') ≧δ}
8.    for each DTD D in SeedSet
9.        S := {D}
10.       S' := S_g - {D' : overlap (D, D') ≧δ}
11.       while (S' is not empty)
12.           let D' be the DTD in S' with the maximum value for score (D',S)
13.           S := S ∪ D'
14.           S' := S' - {D' : overlap (D', D'') ≧δ}
15.   F := FACTOR(S)
16.   S_F := S_F ∪{F_i, . . . , F_m} /* F = F_1| . . . |F_m*/
end
```

Procedure FACTORSUBSETS computes a set S of candidate DTDs to factor. First, k seed DTDs for the sets S to be factored are chosen in the for loop spanning steps 4–7. These seed DTDs have a high score value with respect to $S_G$ and overlap minimally with each other. Thus, it is ensured that each seed DTD not only factors well with other DTDs in $S_G$, but is also significantly different from other seeds. In steps 9–14, each seed DTD is used to construct a new set S of DTDs to be factored (thus, only k sets of DTDs are generated). After initializing S to a seed DTD D, in each subsequent iteration, the next DTD D' that is added to S is chosen greedily (i.e., the one whose score with respect to DTDs in S is maximum and whose overlap with DTDs already in S is less than δ).

Algorithm For Factoring a Set of DTDs

Algorithms for computing the optimum factored form, that is, the one with the minimum number of literals are known in the art. However, the complexity of these known techniques may be impractical. In a preferred embodiment, heuristic factoring algorithms for boolean functions which are known in the art are adapted for use in the present invention. Factored forms of boolean functions are commonly used in VLSI design.

There is a close correspondence between the semantics of DTDs and those of boolean expressions. The sequencing operator (,) in DTDs is similar to a logical AND in boolean algebra, while the OR operator (|) is like a logical OR. However, there exist certain fundamental differences between DTDs and boolean expressions. First, while the logical AND operator in boolean logic is commutative, the sequencing operator in DTDs is not (the ordering of symbols in a sequence matters!). Second, in boolean logic, the expression a|ab is equivalent to a; however, the equivalent DTD for a|ab is ab?. The boolean algorithms can be modified to create a factoring algorithm to handle the semantics of the DTDs. The pseudo-code for procedure FACTOR, is shown in Table 3. Procedure FACTOR is a preferred embodiment of the factoring algorithm used in factoring module 120.

TABLE 3

Factoring Algorithm

```
procedure FACTOR(S)    /* S is the set of sequences to be factored */
begin
1.    DivisorSet := FINDALLDIVISORS(S)
2.    if (DivisorSet = ø)
3.        return or of sequences in S
4.    DivisorList := ø
5.    for each divisor V in DivisorSet
6.        Q, R := DIVIDE(S, V)
7.        add (V, Q, R) to DivisorList
8.    find the most compact triplet (V_i Q_i R_i) in DivisorList
9.    return (FACTOR(V_i))(FACTOR(Q_i)) | FACTOR(R_i)
end
procedure FINDALLDIVISORS(S)
begin
1.    DivisorSet := ø
2.    for each distinct sequence s such that s is a suffix for at least two elements in S
3.        DivisorSet := DivisorSet ∪ { {p : ps ∈ S} }
4.    return DivisorSet
end
procedure DIVIDE(S, V)
begin
1.    for each sequence p and V
2.        q_p := {s : ps { S}
3.    Q := ∩_{p∈V} q_p
4.    R := S - V ○ Q
      /* V ○ Q is the set of sequences resulting from concatenating
         every sequence in Q to the end of every sequence in V */
5.    return Q, R
end
```

As an example of the factoring algorithm, consider the set S=b, c, ab, ac, df, dg, ef, eg} of input sequences corresponding to the expression b|c|ab|ac|df|dg|ef|eg whose factored form is a?(b|c)|(d|e)(f|g). Before the steps that procedure FACTOR performs to derive the factored form are discussed, the DIVIDE operation that constitutes the core of the factoring algorithm is introduced. For sets of sequences S, V, DIVIDE(S,V) returns a quotient Q and remainder V such that S=V∘Q∪R (here, V∘Q is the set of sequences resulting from concatenating every sequence in Q to the end of every sequence in V). Thus, for the above set S and V={d,e}, DIVIDE(S,V) returns the quotient Q={f,g} and remainder R={b,c,ab,ac}. The steps executed by FACTOR to generate the factored form are as follows:

(1.) Compute set of potential divisors for S. These are simply sets of prefixes that have a common suffix in S. Thus, potential divisors for S include {d, e} (both f and g are common suffixes) and {1,a} (both b and c are common suffixes). The symbol "1" is special and denotes the identity symbol with respect to the sequencing operator, that is, 1s=s1=s for every sequence s.

(2.) Choose divisor V from set of potential divisors. This is carried out by first dividing S by each potential divisor V to obtain a quotient Q and remainder R, and then selecting the V for which the triplet (V,Q,R) has the smallest size. In our case, V={d,e} results in a smaller quotient and remainder (Q={f, g}, R={b, c, ab, ac}) than {,a} (Q={b,c}, R={df,dg,ef,eg}) and is thus chosen.

(3.) Recursively factor V, Q, and R. The final factored form is FACTOR(V)FACTOR(Q)|FACTOR(R), where V={d|e}, Q={μg} and R=(b,c,ab,ac). Here, V and Q cannot be factored further since they have no divisors. Thus, FACTOR(V)=(d|e) and FACTOR(Q)=(f|g). However, R can be factored more since {1,a} is a divisor. Thus, repeating the above steps on R, we obtain FACTOR(R)=(1|a)(b|c). Thus, the final factored form is (1|a)(b|c)|(d|e)(f|g).

(4.) Simplify final expression by eliminating "1". The term (1|a) in the final expression can be further simplified to a?. Thus, we obtain the desired factored form for S.

III. Selecting

The step of selecting comprises selecting a DTD. In a preferred embodiment, the DTD comprises one or more sequences from the input sequences, generalized sequences, and factored sequences. Alternatively, the DTD may be selected from the input sequences and generalized sequences if a factoring step is not used. In a preferred embodiment the step of selecting is implemented using minimum descriptor length (MDL) principles.

The MDL cost of a DTD that is used to weigh a set of sequences, is comprised of:

(A) the length, in bits, needed to describe the DTD, and
(B) the length of the sequences, in bits, when encoded in terms of the DTD.

First, the number of bits required to describe the DTD is estimated (part (A) of the MDL cost). Let $\Sigma$ be the set of subelement symbols that appear in sequences in I. Let M be the set of metacharacters |,*, +, ?, (,). Let the length of a DTD viewed as a string in $\Sigma \cup M$, be n. Then, the length of the DTD in bits is n log(|$\Sigma$|+|M|). As an example, let $\Sigma$ consist of the elements a and b. The length in bits of the DTD a* b* is 4*log(2+6)=12. Similarly, the length in bits of the DTD (ab|abb)(aa|ab*) is 16*3=48.

The Encoding Scheme comprises the following steps:

(A) seq(D, s)=$\epsilon$ if D=s. In this case, DTD D is a sequence of symbols from the alphabet $\Sigma$ and does not contain any metacharacters.

(B) seq($D_1 \ldots D_k$, $s_1 \ldots s_k$)=($D_1, s_1$) $\ldots$ seq($D_k, s_k$) that is, D is the concatenation of regular expressions $D_1 \ldots D_k$, and the sequence s can be written as the concatenation of the subsequences $s_1 \ldots s_k$ such that each subsequence $s_i$ matches the corresponding regular expression $D_i$.

(C) seq($D_1 | \ldots | D_m$, s)=i seq($D_i$, s) that is, D is the exclusive choice of regular expressions $D_1 \ldots D_m$, and i is the index of the regular expression that the sequence s matches. Note that we need $\lceil \log m \rceil$ bits to encode the index i.

$$(D)\ seq(D^*, s_l \ldots s_k) = \begin{cases} k\ seq(D, s_1) \ldots seq(D, s_k) & \text{if } k > 0 \\ 0 & \text{otherwise} \end{cases}$$

In other words, the sequence s=$s_1 \ldots s_k$ is produced from D* by instantiating the repetition operator k times, and each subsequence $s_i$ matches the i-th instantiation. In this case, since there is no simple and inexpensive way to bound apriori, the number of bits required for the index k, we first specify the number of bits required to encode k in unary (that is, a sequence of $\lceil \log k \rceil$ 1s, followed by a 0) and then the index k using $\lceil \log k \rceil$ bits. The 0 in the middle serves as the delimiter between the unary encoding of the length of the index and actual index itself.

Table 4: Encoding Scheme

The MDL subsystem is responsible for choosing a set S of candidate DTDs from $S_F$ such that the final DTD D (which is a logic OR of the DTDs in S) (1) encompasses all sequences in I, and (2) has the minimum MDL cost.

Next, the scheme for encoding a sequence using a DTD (part (B) of the MDL cost) is determined. The encoding scheme constructs a sequence of integral indices (which forms the encoding) for expressing a sequence in terms of a DTD. The following simple examples illustrate the basic building blocks on which the encoding scheme for more complex DTDs is built:

(1.) The encoding for the sequence a in terms of the DTD a is the empty string $\epsilon$.

(2.) The encoding for the sequence b in terms of the DTD a|b|c is the integral index 1 (denotes that b is at position 1, counting from 0, in the above DTD).

(3.) The encoding for the sequence bbb in terms of the DTD b* is the integral index 3 (denotes 3 repetitions of b).

Next, the encoding scheme for arbitrary DTDs and arbitrary sequences is generalized. The sequence of integral indices for a sequence s when encoded is denoted in terms of a DTD D by seq(D,s). We define seq(D,s) recursively in terms of component DTDs within D as shown in Table 4. Thus, seq(D,s) can be computed using a recursive procedure based on the encoding scheme of the factoring algorithm depicted in Table 4. Note that the definitions of the encodings for operators + and ? have not been provided since these can be defined in a similar fashion to * (for +, k is always greater than 0, while for ?, k can only assume values 1 or 0).

Next the encoding scheme is illustrated using the following example. Consider the DTD (a|b|c)*(d|e|f|g*) and the sequence abccabfggg to be encoded in terms of the DTD.

Below, we list how steps (A), (B), (C) and (D) in Table 4 are recursively applied to derive the encoding seq((ab|c)* (de|fg*); abccabf ggg).

1. Apply Step (B). seq((ab|c)*; abccab))seq((de|fg*); fggg)
2. Apply Step (D). 4 seq(ab|c, ab) seq(ab|c, c) seq(ab|c, c) seq(ab|c, ab) seq((de|f g*); f ggg)
3. Apply Step (C). 4 0 seq(ab, ab) 1 seq(c, c) 1 seq(c, c) 0 seq(ab, ab) 1 seq(f g*, f ggg)
4. Apply Step (A). 4 0 1 1 0 1 seq(f g*, f ggg)
5. Apply Steps (A), (B) and (D). 4 0 1 1 0 1 3

In order to derive the final bit sequence corresponding to the above indices, the unary representation for the number of bits required to encode the indices 4 and 3 is included in the encoding. Thus, the following bit encoding for the sequence is obtained:

seq((ab|c)*(de|fg*), abccabfggg)=1110100 0 1 1 0 1 11011

In steps (B), (C) and (D), of the encoding scheme it needs to be determined if a sequence s matches a DTD D. Since a DTD is a regular expression, known techniques for finding out if a sequence is encompassed by a regular expression can be used. These known methods involve constructing a non-deterministic finite automaton for D and can also be used to decompose the sequence s into subsequences such that each subsequence matches the corresponding sub-part of the DTD D, thus enabling the encoding to be determined.

Note that there may be multiple ways of partitioning the sequence s such that each subsequence matches the corresponding sub-part of the DTD D. In such a case, the above procedure can be extended to enumerate every decomposition of s that match sub-parts of D, and then select from among the decompositions, the one that results in the minimum length encoding of s in terms of D.

Computing the DTD with Minimum MDL Cost

Next, the final DTD D (which is a logic OR of a subset S of candidate DTDs in $S_F$) that encompasses all the input sequences and whose MDL cost for encoding the input sequences is minimum is computed. The minimization problem maps naturally to the Facility Location Problem (FLP). The Facility Location Problem is well known in the art. The FLP is formulated as follows: Let C be a set of customers and J be a set of facilities such that the facilities "serves" every customer. There is a cost c(j) of "choosing" a facility j∈J and a cost d(j, i) of serving customers i∈C by facility j∈J. The problem definition asks to choose a subset of facilities F ⊂ J such that the sum of costs of the facilities plus the sum of costs of serving every client by its closest chosen facility is minimized, that is $$\min_{F \subset J} \left\{ \sum_{j \in F} c(j) + \sum_{i \in C} \min_{j \in F} d(j, i) \right\}$$

The problem of inferring the minimum MDL cost DTD can be reduced to the FLP as follows: Let C be the set input sequences and J be the set of candidate DTDs in $S_F$. The cost of choosing a facility is the length of the corresponding candidate DTD. The cost of serving client i from facility j, d(j, i), is the length of the encoding of the sequence corresponding to i using the DTD corresponding to the facility j. If a DTD j does not encompass a sequence i, then we set d(j, i) to 1. Thus, the set F computed by the FLP corresponds to the desired set S of candidate DTDs. Algorithms for solving the FLP are well known in the art. In a preferred embodiment, a randomized algorithm is employed to approximate the FLP.

Having thus described a few particular embodiments of the invention, various alterations, modifications, and improvements will readily occur to those skilled in the art. For example, the invention may be embodied in computer program instructions stored in a computer-readable medium, e.g., floppy disc, hard drive, CD ROM, DVD, ROM, RAM, punch card, magnetic tape, etc. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

Experimental Results

In order to determine the effectiveness of the present invention for inferring the DTD of a database of XML documents, we conducted a study with both synthetic and real-life DTDs. We also compared the DTDs produced by a DTD extraction tool (XTRACT) in accordance with a preferred embodiment of the present invention with those generated by the IBM alphaworks DTD extraction tool, DDbE (Data Description by Example). The results indicate that XTRACT outperforms DDbE over a wide range of DTDs, and accurately finds almost every original DTD while DDbE fails to do so for most DTDs. Thus, the results clearly demonstrate the effectiveness of XTRACT's approach that employs generalization and factorization to derive a range of general and concise candidate DTDs, and then uses the MDL principle as the basis to select from amongst them.

The two DTD extraction algorithms considered in the experimental study are as follows:

XTRACT: XTRACT includes all three steps for determining a DTD in accordance with the present invention. In the generalization step, we discover both sequencing and OR patterns using procedure GENERALIZE. In the factoring step, k=N/10 subsets are chosen for factoring and the parameter δ is set to 0 in the procedure FACTORSUBSETS. Finally, in the selection step, we employ an algorithm which incorporate MDL principles to compute an approximation to the facility location problem (FLP).

DDbE: We used Version 1.0 of the DDbE DTD extraction tool in the experiments. DDbE is a Java component library for inferring a DTD from a data set consisting of well-formed XML instances. DDbE offers parameters which permit the user to control the structure of the content models and the types used for attribute declarations. Some of the important parameters of DDbE that we used in the experiments, along with their default values, are presented in Table 5.

TABLE 5

Description of Parameters Used by DDbE

| Parameter | Meaning | Default |
|---|---|---|
| c | Maximum number of consecutive identical tokens not replaced by a list | 1 |
| d | Maximum depth of factorization | 2 |

The parameter c specifies the maximum number of consecutive identical tokens that should not be replaced by a list. For example, the default value of this parameter is 1 and thus all sequences containing two or more repetitions of the same symbol are replaced with a positive list. That is, aa is substituted by a+. The parameter d determines the number of applications of factoring. For a set of input sequences that conform to the DTD of a(b|c|d)(e|f|g)h, for increasing values of the parameter d, DDbE returns the DTDs in Table 6.

TABLE 6

DTDs generated by DDbE for Increasing Values of Parameter d

| Parameter Value (d) | DTD Obtained |
| --- | --- |
| 1 | (acg|ace|adf|abg|abe|acf|adg|ade|abf)h |
| 2 | a(cg|ce|df|bg|be|ct|dg|de|bf)h |
| 3 | a((c|b|d)g|(d|c|b)f|(c|b|d)e)h |
| 4 | a((c|b|d)g|(d|c|b)f|(c|b|d)e)h |

As shown in Table 6, for d=1, factorization is performed once in which the rightmost symbol h is factored out. When the value of d becomes 2, the leftmost symbol a is also factored out. A further increase in the value of d to 3 causes factorization to be performed on the middle portion of the expression and the common expression (b|c|d) to be extracted. However, note that subsequent increases in the value of d (beyond 3) do not result in further changes to the DTD. This seems to be a limitation of DDbE's factoring algorithm since examining the DTD for d=3, we can easily notice that e, f and g have a common factor of (b|c|d) with different placement of the symbols within the parenthesis. However, the current version of DDbE cannot factorize this further.

In order to evaluate the quality of DTDs retrieved by XTRACT, we used both synthetic as well as real-life DTD schemas. For each DTD for a single element, we generated an XML file containing 1000 instantiations of the element. These 1000 instantiations were generated by randomly sampling from the DTD for the element. Thus, the initial set of input sequences to both XTRACT and DDbE contained somewhere between 500 and 1000 sequences (after the elimination of duplicates) conforming to the original DTD.

The Data

Synthetic DTD Data Set: We used a synthetic data generator to generate the synthetic data sets. Each DTD is randomly chosen to have one of the following two forms: $A_1|A_2|A_3|A_n$ and $A_1 A_2 A_3 \ldots A_n$. Thus, a DTD has n building blocks where n is a randomly chosen number between 1 and mb, where mb is an input parameter to the generator that specifies the maximum number of building blocks in a DTD. Each building block $A_i$ further consists of $n_i$ symbols, where $n_i$ is randomly chosen to be between 1 and ms (the parameter ms specifies the maximum number of symbols that can be contained in a building block). Each building block $A_i$ has one of the following four forms, each of which has an equal probability of occurrence: (1) $(a_1|a_2|a_3| \ldots |a_{ni})$ (2) $a_1 a_2 a_3 \ldots a_{ni}$ (3) $(a_1|a_2|a_3|a_4| \ldots |a_{ni})^*$ (4) $(a_1 a_2 a_3 a_4 \ldots a_{ni})^*$. Here, the $a_i$'s denote subelement symbols. Thus, the synthetic data generator essentially generates DTDs containing one level of nesting of regular expression terms.

In Table 7, we show the synthetic DTDs that we considered in the experiments (note that, in Table 7, we only include the regular expression corresponding to the DTD). The DTDs were produced using the generator with the input parameters mb and ms both set to 5. Note that we use letters from the alphabet as subelement symbols.

TABLE 7

Synthetic DTD Data Set

| No. | Original DTD |
| --- | --- |
| 1 | abcde|ef gh|ij|klm |
| 2 | (a|b|c|d|f)* gh |
| 3 | (a|b|c|d)* |e |
| 4 | (abcde)* f |
| 5 | (ab)* |cdef|(ghi)* |
| 6 | abcdef(g|h|i|j)(k|l|m|n|o) |
| 7 | (a|b|c)d* e* (f gh)* |
| 8 | (a|b)(cdefg)* hijklmnopq(r|s)* |
| 9 | (abcd)* |(e|f|g)* |h|(ijklm)* |
| 10 | a* |(b|c|d|e|f)* |gh|(i|j|k)* |(lmn)* |

The ten synthetic DTDs vary in complexity with later DTDs being more complex than the earlier ones. For instance, DTD 1 does not contain any metacharacters, while DTDs 2 through 5 contain simple sequencing and OR patterns. DTD 6 represents a DTD in factored form while in DTDs 7 through 10, factors are combined with sequencing and OR patterns.

Real-life DTD Data Set: We obtained the real-life DTDs from the Newspaper Association of America (NAA) Classified Advertising Standards XML DTD produced by the NAA Classified Advertising Standards Task Force. We examined this real-life DTD data and collected six representative DTDs that are shown in Table 8. Of the DTDs shown in the table, the last three DTDs are quite interesting. DTD 4 contains the metacharacter ? in conjunction with the metacharacter *, while DTDs 5 and 6 contain two regular expressions with *'s, one nested within the other.

TABLE 8

Real-life DTD Data Set

| No. | Original DTD | Simplified DTD |
| --- | --- | --- |
| 1 | <ENTITY % included-elements "audio-clip \| blind-box-reply \| graphic \| linkpi-char \| video-clip"> | a\|b\|c\|d\|e |
| 2 | <ELEMENT communications-contacts (phone \| faxjemail \| pager \| web-page)*> | (a\|b\|c\|d\|e)* |
| 3 | <ELEMENT employment-services(employment-service.type; employment-service.location * (e.zz-generic-tag)*)> | ab* c* |
| 4 | <ENTITY % location"addr* , geographic-area?, city?, state-province?,postal-code?, country?"> | a* b?c?d? |
| 5 | <ELEMENT transfer-info(transfer-number; (from-to, company-id)+,contact-info)*> | (a(bc) + d)* |
| 6 | <ELEMENT real-estate-services(real-estate-service.type, real-estate-service.location?, r-e.response-modes*> r-e.comment?)* ? | (ab?c* d?)* |

Quality of Inferred DTDS

Synthetic DTD Data Set: The DTDs inferred by XTRACT and DDbE for the synthetic data set are presented in Table 9. As shown in the table, XTRACT infers each of the original DTDs correctly. In contrast, DDbE computes the accurate DTD for only DTD 1 which is the simplest DTD containing no metacharacters. Even for the simple DTDs 2–5, not only is DDbE unable to correctly deduce the original DTD, but it also infers a DTD that does not encompass the set of input sequences. For instance, one of the input sequences encompassed by DTD 2 is gh which is not encompassed by the DTD inferred by DDbE. Thus, while XTRACT infers a DTD that encompasses all the input sequences, the DTD returned by DDbE may not encompass every input sequence. DTD 4 exemplifies the two typical behaviors of DDbE—(1) sequence f that is not frequently repeated is appended to both the front and the back of the final DTD, and (2) symbols that are repeated frequently are all OR'd together and encapsulated by the metacharacter.+. For example, DDbE incorrectly identifies the term (abcde)* to be (a|b|c|d|e)* which is much more general. Thus, the DDbE tool has a tendency to over-generalize when the original DTDs contain regular expressions with *s. This same trend to over-generalize can be seen in DTDs 8–10 also. On the other hand, as is evident from Table 9, this is not the case for XTRACT which correctly infers every one of the original DTDs even for the more complex DTDs 8–10 that contain various combinations of sequencing and OR patterns. This clearly demonstrates the effectiveness of the generalization module in discovering these patterns and the MDL module in selecting these general candidate DTDs as the final DTDs.

Also, as discussed earlier, DDbE is not very good at factoring DTDs. For instance, unlike XTRACT, DDbE is unable to derive the final factored form for DTD 6. Finally, DDbE infers an extremely complex DTD for the simple DTD 7. The results for the synthetic data set clearly demonstrate the superiority of XTRACT's approach (based on the combination of generalizing, factoring, and selecting using MDL principles) compared to DDbE's for the problem of inferring DTDs.

Real-life DTD Data Set: The DTDs generated by the two algorithms for the real-life data set are shown in Table 10. Of the five DTDs, XTRACT is able to infer all five correctly. In contrast, DDbE is able to derive accurate DTDs only for DTDs 1 and 2, and an approximate DTD for DTD 3. Basically, with an additional factoring step, DDbE could obtain the original DTD for DTD 3. Note, however, that DDbE is unable to infer the simple DTD 4 that contains the metacharacter ?. In contrast, XTRACT is able to deduce this DTD because its factorization step takes into account the identity element "1" and simplifies expressions of the form 1|a to a?. DTD 5 represents an interesting case where XTRACT is able to mine a DTD containing regular expressions containing nested *s. This is due to the generalization module that iteratively looks for sequencing patterns. On the other hand, DDbE simply over-generalizes the DTD 5 by ORing all the symbols in it and enclosing them within the metacharacter +.

TABLE 9

DTDs generated by XTRACT and DDbE for Synthetic Data Set

| No. | Original DTD | DTD Inferred by XTRACT | DTD Inferred by DDbE |
|---|---|---|---|
| 1 | abcde|ef gh|ij|klm | abcde|ef gh|ij|klm | abcde|efghij|klm |
| 2 | (a|b|c|d|f)* gh | (a|b|c|d|f)* gh | gh(a|b|c|d|f) + gh |
| 3 | (a|b|c|d)* |e | (a|b|c|d)* |e | (e(a|c|d|b) + e) |
| 4 | (abcde)* f | (abcde)* f | (f(a|e|d|c|b) + f) |
| 5 | (ab)* |cdef|(ghi)* | (ab)* |cdef|(ghi)* | cdef(a|b|g·i|h) + cdef |
| 6 | abcdef(g|h|i|j) (k|l|m|n|o) | abcdef(g|h|i|j) (k|l|m|n|o) | abcdef(j(o|l|m|n|k)|g(o|l|n| m|k))h(m|l|n|k|o)| i(o|l|n|m|k)) |
| 7 | (a|b|c)d* e* (f gh)* | (a|b|c)d* e* (f gh)* | ((c|b|a) d + e + |ad + |bd + |c(e + d+)?|ad*|be*))(f|h|g) + ((a|b|c)d + e + |c (e + |d+)?|a(e + | d+)?|b(e + |d+)?) |

TABLE 9-continued

DTDs generated by XTRACT and DDbE for Synthetic Data Set

| No. | Original DTD | DTD Inferred by XTRACT | DTD Inferred by DDbE |
|---|---|---|---|
| 8 | (a|b)(cdef g)* hijklmnopq(r|s)* | (a|b)(cdefg)* hijklmnopq(r|s)* | ((((a|b)hijabcdef g)|b|a)(c|g|f |e|d|s|r) + ((b|a)? hijkamnopq)) |
| 9 | (abcd)* |(e|f|g)* |h|(ijklm)* | (abcd)* |(i|klm)* |h|(e|f|g)* | h(a|d|c|b|e|g|f|i|m|l|k| j) + h |
| 10 | a* |(b|c|d|e|f)* |g|h|(i|j|k)* | (lmn) | a* |(b|c|d|e|f)* |g|h|(i|j|k)* |(lmn)* | (a + |gh)(e|f |d|i|j|l|n|m|k|c|b) + (a + |gh) |

TABLE 10

DTDs generated by XTRACT and DDbE for Real-life Data Set

| No. | Original DTD | DTD Obtained by XTRACT | DTD Obtained by DDbE |
|---|---|---|---|
| 1 | a|b|c|d|e | a|b|c|d|e | a|b|c|d|e |
| 2 | (a|b|c|d|e)* | (a|b|c|d|e)* | (a|b|c|d|e)* |
| 3 | (ab* c*) | ab* c* | (ab + c*)|(ac*) |
| 4 | a* b?c?d? | a* b?c?d? | (a + b(c|(c?d))?)|((b|a+)?cd)| ((a+|b)?d)|((a+|b)?c)|a+|b) |
| 5 | (a(bc) + d)* | (a(bc)* d)* | (a|b|c|d)+ |

The quality of the DTDs inferred by XTRACT was compared with those returned by the IBM alphaworks DDbE (Data Descriptors by Example) DTD extraction tool on synthetic as well as real-life DTDs. In the experiments, XTRACT outperformed DDbE by a wide margin, and for most DTDs it was able to accurately infer the DTD while DDbE completely failed to do so. A number of the DTDs which were correctly identified by XTRACT were fairly complex and contained factors, metacharacters, and nested regular expression terms. Thus, the results clearly demonstrate the effectiveness of XTRACT's approach that employs generalization and factorization to derive a range of general and concise candidate DTDs, and then uses a selection step preferably comprising minimum descriptor length (MDL) principles as the basis to select from amongst them.

What is claimed is:

1. A document descriptor determination method comprising the steps of:
   generalizing input sequences associated with a document to develop general sequences, said input sequences reflecting the structure of a document;
   factoring said input sequences and said general sequences to develop factored sequences;
   selecting a document descriptor from said input sequences, said general sequences, and said factored sequences using minimum descriptor length (MDL) principles.

2. The method of claim 1, wherein said selecting step comprises the steps of:
   encoding said input sequences, said general sequences, and said factored sequences; and
   selecting a document descriptor which encompasses all of said input sequences and exhibits a minimum MDL cost.

3. The method of claim 2, wherein said encoding step employs an algorithm which applies a set of rules comprising:

seq(D,s)=ε if D=s, if D does not contain metacharacters;
seq($D_1 \ldots D_k, s_1 \ldots s_k$)=seq($D_1,s_1$) ... seq($D_k,s_k$);
seq($D_1| \ldots |D_m,s$)=i seq($D_i,s$);
seq($D^*,s_1 \ldots s_k$)={k seq($D,s_1$) ... seq($D,s_k$) if k>0; 0 otherwise};
wherein D is a sequence of symbols, s is a sequence, and i is an index of a regular expression that the corresponding sequence s matches, wherein log m bits are needed to encode index i.

4. The method of claim 3, wherein said minimum MDL cost is determined by employing an algorithm to solve a facility location problem (FLP), said FLP modified to compute said minimum MDL cost of potential document descriptors.

5. The method of claim 4, wherein said document descriptor is a document type descriptor (DTD), and said document is an eXtensible Markup Language (XML) document.

6. The method of claim 5, wherein said minimum MDL cost comprises summing a first length of bits describing the DTD and a second length of bits for encoding the sequences.

7. A document descriptor determination method comprising the steps of:
   generalizing input sequences to develop general sequences, said input sequences reflecting the structure of data within a document;
   selecting a document descriptor from said input sequences and said general sequences using minimum descriptor length (MDL) principles.

8. The method of claim 7, wherein said selecting step comprises the steps of:
   encoding said input sequences and said general sequences; and
   selecting a document descriptor which encompasses all of said input sequences and exhibits a minimum MDL cost.

9. The method of claim 8, wherein said encoding step employs an algorithms which applies a set of rules comprising:
   seq(D,s)=ε if D=s, if D does not contain metacharacters;
   seq($D_1 \ldots D_k, s_1 \ldots s_k$)=seq($D_1,s_1$) ... seq($D_k,s_k$), if D is a concatenation of $D_1 \ldots D_k$;
   seq($D_1| \ldots |D_m,s$)=i seq($D_i,s$);
   seq($D^*,s_1 \ldots s_k$)={k seq($D,s_1$) ... seq($D,s_k$) if k>0; 0 otherwise};
   wherein D is a sequence of symbols, s is a sequence, and i is an index of a regular expression that the corresponding sequence s matches, wherein log m bits are needed to encode index i.

10. The method of claim 9, wherein said minimum MDL cost is determined by employing an algorithm to solve a facility location problem (FLP), wherein said FLP is modified to compute said minimum MDL cost of potential document descriptors.

11. The method of claim 10, wherein said document descriptor is a document type descriptor (DTD), and said document is an extensible Markup Language (XML) document.

12. The method of claim 11, wherein said minimum MDL cost comprises summing a first length of bits describing the DTD and a second length of bits for encoding the sequences.

13. The method of claim 7, further comprising the step of:
   factoring said input sequences and said general sequences to develop factored sequences, wherein said factored sequences are available for said step of selecting.

14. A document descriptor determination method comprising the steps of:
   generalizing input sequences, said generalizing step comprising the steps of:
   discovering OR patterns among said input sequences, and
   discovering sequence patterns among said input sequences and OR patterns; and
   selecting a document descriptor from said input sequences and said general sequences.

15. The method of claim 14, wherein said discovering OR patterns step comprises the step of partitioning said input sequences.

16. The method of claim 15, further comprising the steps of:
   factoring said input sequences and said general sequences to develop factored sequences, wherein said factored sequences are available to said step of selecting.

17. The method of claim 16, wherein said step of selecting employs minimum descriptor length (MDL) principles.

18. The method of claim 14, wherein said document descriptor is a document type descriptor (DTD) and said document is an extensible Markup Language (XML) document.

* * * * *